US009967747B2

(12) United States Patent
Rotter et al.

(10) Patent No.: US 9,967,747 B2
(45) Date of Patent: *May 8, 2018

(54) DETERMINING IDENTITY OF INDIVIDUALS USING AUTHENTICATORS

(71) Applicant: Rivetz Corp., Richmond, MA (US)

(72) Inventors: Bradley N. Rotter, San Mateo, CA (US); Pavan K. Muddana, Cerrtos, CA (US)

(73) Assignee: Rivetz Corp., Richmond, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/231,298

(22) Filed: Aug. 8, 2016

(65) Prior Publication Data

US 2016/0353282 A1 Dec. 1, 2016

Related U.S. Application Data

(63) Continuation of application No. 14/530,168, filed on Oct. 31, 2014, now Pat. No. 9,426,151.

(Continued)

(51) Int. Cl.
*G06F 7/04* (2006.01)
*H04W 12/06* (2009.01)
(Continued)

(52) U.S. Cl.
CPC ......... *H04W 12/06* (2013.01); *H04L 63/0861* (2013.01); *H04L 63/10* (2013.01); *H04W 12/08* (2013.01)

(58) Field of Classification Search
CPC .... H04L 63/0861; H04L 63/10; H04W 12/06; H04W 12/08

(Continued)

(56) References Cited

U.S. PATENT DOCUMENTS 9,426,151 B2 8/2016 Richards et al.
2003/0115142 A1 6/2003 Brickell et al.
(Continued)

FOREIGN PATENT DOCUMENTS

WO WO 2015/066511 A1 5/2015

OTHER PUBLICATIONS

International Search Report for International Application No. PCT/US2014/063493, entitled "Determining Identity of Individuals Using Authenticators," dated Feb. 24, 2014 and consisting of 3 pages.

(Continued)

*Primary Examiner* — Mohammad W Reza
(74) *Attorney, Agent, or Firm* — Hamilton, Brook, Smith & Reynolds, P.C.

(57) ABSTRACT

Systems are provided that allow users to access resources in a manner that addresses inherent deficiencies in existing authentication systems. During a typical authentication process, the system may connect the user to one or more authenticators in real time through a variety of communications channels so that the authenticators may verify that the user is who he/she purports to be. In this way, a user may be authenticated and allowed to complete transactions that require access to protected resources/transactions. In some embodiments, the system may automatically identify authenticators for a user via an onboarding process by searching the user's electronic files, accessing social and professional networking sites, searching one or more credit reporting databases, or other such means. Based upon the determinations made by the authenticators, and other factors, such as the trust scores assigned to authenticators, an authentication engine may be used to calculate a confidence score regarding the user's identity that may be utilized in determining whether to grant the user access to protected resources/transactions.

12 Claims, 8 Drawing Sheets

Related U.S. Application Data

(60) Provisional application No. 61/898,891, filed on Nov. 1, 2013.

(51) Int. Cl.
  *H04L 29/06* (2006.01)
  *H04W 12/08* (2009.01)

(58) Field of Classification Search
  USPC .......................................................... 726/4
  See application file for complete search history.

(56) References Cited

U.S. PATENT DOCUMENTS

| | | | |
|---|---|---|---|
| 2003/0180815 A1* | 9/2003 | Rawson | G01N 33/558 435/7.9 |
| 2004/0243514 A1* | 12/2004 | Wankmueller | G06Q 20/04 705/40 |
| 2007/0261101 A1 | 11/2007 | Thapliyal et al. | |
| 2010/0063935 A1 | 3/2010 | Thomas et al. | |
| 2011/0246196 A1* | 10/2011 | Bhaskaran | G10L 17/24 704/235 |
| 2012/0253809 A1 | 10/2012 | Thomas et al. | |
| 2012/0265631 A1 | 10/2012 | Cronic et al. | |
| 2014/0096215 A1 | 4/2014 | Hessler | |

OTHER PUBLICATIONS

Written Opinion for International Application No. PCT/US2014/063493, entitled "Determining Identity of Individuals Using Authenticators," dated Feb. 23, 2015, consisting of 21 pages.

Notification Concerning Transmittal of International Preliminary Report on Patentability for International Application No. PCT/US2014/063493, entitled "Determining Identity of Individuals Using Authenticators," dated May 12, 2016 and consisting of 23 pages.

\* cited by examiner

DETERMINING IDENTITY OF INDIVIDUALS USING AUTHENTICATORS

RELATED APPLICATION

This application is a continuation of U.S. application Ser. No. 14/530,168, filed Oct. 31, 2014, claims the benefit of U.S. Provisional Application No. 61/898,891, filed on Nov. 1, 2013. The entire teachings of the above applications are incorporated herein by reference.

BACKGROUND

When information systems restrict access, controlling the authentication of individuals can be extremely important to ensure that only authorized users are allowed to interface with such systems. User authentication may be required to authenticate or verify a user or device in order to, for instance, allow access, approve a transaction, reset a password, grant authority to others, allow access to a physical resource connected to the device (e.g. door lock), and the like.

Traditionally, service providers have relied on a username/password or PIN to authorize access. More recently, industry practice has veered away from reliance on such knowledge factors alone and instead moved toward multi-factor authentication. Multi-factor online authentication typically requires a user to enter a username and password, as well satisfy one or more authentication factors. There are generally three general types of authentication categories: a knowledge factor (e.g. something only the user knows, such as a password, challenge response), a possession factor (e.g. something only the user has, such as a cell phone), and an inherence factor (e.g. something only the user is, such as face/voice/fingerprint matching).

Even with multi-factor authentication, the user typically has to remember his or her username and password. Often, with an increased number of different accounts a user may have with different service providers, a user may forget knowledge based authentication information associated with the various accounts. To address this, many authentication systems are configured to enable users to reset or email passwords and provide hints to aid the user's responses to knowledge based queries.

SUMMARY

While reliable methods for authentication exist, issues remain. User authentication based on multi-factor identification, such as a username/password confirmation combined with SMS confirmation and biometric fingerprints, for example, may be reliable, but typically lack flexibility, are susceptible to theft or misappropriation, and can be inconvenient to both the service provider handling the authentication process and to the user attempting to access to the service provider's services.

The type of factors required are often implemented and imposed by the information service provider. Implementation of the multi-factor authentication protocols can burden the service provider by, for example, imposing expensive business process reengineering and maintenance of its systems to ensure that its security protocols are robust. Further, multi-factor authentication protocols can burden users requesting access by forcing the users to comply with potentially rigid authentication requirements.

Users typically have a multitude of online accounts, which often causes users to struggle to recall their responses to all of the knowledge factors that need to be satisfied for authentication, especially if it is a password that is infrequently used or is frequently-changed. Further, such knowledge based factors are easily compromised with key loggers that can capture, for instance, a username and password typed on the user's device. In addition, hackers can use phishing and pharming techniques for the purpose of getting such knowledge based personal/confidential information from the users (i.e., personal, financial or password data). Thus, knowledge based factors can be both burdensome for the user and unsecure.

The burden on users to recall such knowledge based information can be alleviated and information security can be improved by relying on inherence factors, such as biometrics, to authorize access. While inherence factors are in many respects more secure than knowledge based factors, such inherence factors (e.g. voice, fingerprint, iris, vein, face, etc.) can be compromised by hacking the identification system. Even with a robust identification and access management system that may be capable of thwarting hackers, such systems can be cost prohibitive to implement.

Authentication using knowledge based and inherent factors has another inherent flaw. Both methods rely on stored values that, even encrypted, are susceptible to theft or misappropriation. The theft of biometric information (e.g. an iris scan), in particular, may cause significant problems because due to its inherent uniqueness and permanence, the user cannot change the biometric data, as the user could change a password (e.g. user cannot change to another iris).

Thus, implementing an identity and access management solution requires a delicate balance between cost, and providing robust security, and usability. In today's dynamic global environment, finding that balance for an identity and access management solution can mean the difference between the success and failure of a new product or even a new company. The currently available information security schemes are generally unable to provide a security solution that satisfies business/operational security requirements, while providing a future-forward scalable, cost effective solution capable of providing strong security and being user friendly.

Some example embodiments of the present invention provide improved systems, methods, and computer program products to allow a user/requestor to perform transactions that require accessing protected resources in a manner that can eliminate the deficiencies in knowledge and inherent based solutions of the past. For example, some of the embodiments provided allow a user to identify human authenticators who know the user well. Then during the authentication process, the system may put a requestor purporting to be the user in live contact with the authenticators, such as a video conference, in which the authenticators may interact with the requestor to confirm whether the requestor is indeed the user that they know well.

In an example embodiment, the user may register to setup an account with the authentication system of the present invention to perform transactions that require accessing the resources protected by the system. In these embodiments, the user may, by means of a request handler or application, transmit a registration request to the authentication system to be received by an authentication engine component of the system. The request may be communicated over various networks, including an out-of-band network. In some embodiments, the authentication engine may be implemented on a trusted platform module, and in other embodiments, the authentication engine may not be a separate physical server but an integrated part of a virtual cloud network. In some embodiments, the authentication system may be an interactive voice response (IVR) system, in which the authentication engine is implemented as an IVR device coupled to a telephony server and the registration request may be a voice communication requiring interpretation by the IVR device.

The authentication engine may perform an initial confirmation of the user's identity, which requires collecting data regarding the user. In some embodiments, collecting data may include contacting individuals associated with the user, checking context on social or professional networking sites, or sending a letter or package to the user by some form of certified delivery. Collecting data may also include searching the user's electronic files, posing questions to the user to gather answers, and searching one or more credit report databases for information on the user. The data collected regarding the user may be in the form of text, images, voice, video, or forensic data. After collecting the data regarding the user, the authentication engine may determine whether to confirm the user's identity by calculating a confidence score that takes into account some or all of the data.

As part of the example embodiment, the authentication engine may determine one or more authenticators capable of confirming the user's identity for performing subsequent transactions. The authenticators may be third-party human trustees with a relationship to the user, the user my means of one or more devices calibrated as part of the registration process, or other third-party devices or services that may assist in confirming the identity of the user. The authentication engine may store information regarding the authenticators in records corresponding to each authenticator. The records may be retrieved during a subsequent transaction to contact one or more of the authenticators in order for the one or more authenticator to confirm that a requestor attempting to perform a transaction using the user's account is the user. The records corresponding to an authenticator may contain contact information for the authenticator, relationship information to the user, or verification information to be used for the authenticator to confirm the user's identity. The data contained in the records may be in the form of text, images, voices, video, or forensic data.

In the same or a different example embodiment, a request may attempt to perform transactions that require accessing the resources protected by the system. In these embodiments, the user may, by means of a request handler or application, transmit an authentication request to the authentication system to be received by an authentication engine component of the system. In response to receiving the request, the authentication engine may retrieve account information for the registered user indicated in the request. The requestor sending the request may or may not be the registered user indicated in the request. Based on the retrieved account information, the authentication engine may retrieve records corresponding to one or more authenticators selected to confirm the registered user's identity. The authenticators may be third-party human trustees with a relationship to the user, the user my means of one or more devices calibrated as part of the registration process, or other third-party devices or services that may assist in confirming the identity of the user. The records corresponding to an authenticator may contain contact information for the authenticator, relationship information to the user, or verification information to be used for the authenticator to confirm the user's identity.

In some embodiments, the authentication engine sends information from the records to one or more corresponding authenticators, by means of a verification handler or application, to confirm whether the requestor is a registered user. The information sent to the authenticators from the authenticator records may be in the form of text, images, voices, video, or forensic data. The information sent from the at least one record may include questions presented to the requestors and corresponding answers may be in the records to verify the requestor's answer. The authentication engine may also collect information during the authentication process that may or may not be in the record to present to the authenticators, present to the requestor, or both. This information may also be collected to compare against data in the records or against information provided by the requestor during the authentication process. This information may include electronic files, information from social or professional networking sites, or information from one or more credit report agencies.

The information presented to the authenticators may also be collected in live or recorded format from the requestor during the authenticator process. In some embodiments, the information may be collected in a conference call including the requestor and one or more authenticators. In other embodiments, the information may be collected in a series of individual calls between the requestor and one or more authenticators, or in a joint call with the requestor and one or more authenticators or some combination of both. The information may be collected by the authenticators asking the requestor questions, or the authenticators may only see and hear the requestor without interacting with the requestor.

Once the authenticators are presented with information regarding the requestor's identity, the authentication engine may determine whether to allow the user access to the secure resources based on a response from at least one authenticator. The response from an authenticator may be expressed as a confirm or deny response and may further include the authenticator's level of certainty in the response. Based on the authenticator's response, the authentication engine may calculate a statistical confidence score to determine whether to allow the requestor access to the protected resources. This score may be based on the confirm/deny and level of certainty of each authenticators, but the score may also consider the level of confidence in the authenticator reporting the result. The confidence score may also reflect other data collected regarding the user, such as data from the requestor's electronic files, information on social or professional networking sites, one or more credit report agencies, or forensic data collected during the authentication process from the requestor compared to data on record for the user. The authentication engine may weigh the calculated confidence score against a threshold level to allow or not allow the requestor to perform the transaction.

The communications between the requestor devices, authenticator devices, and authentication engine may be communicated over various networks, including an out-of-band network. In some embodiments, the authentication engine may be implemented on a trusted platform module, and in other embodiments, the authentication engine may not be a separate physical server but an integrated part of a virtual cloud network. In some embodiments, the authentication system may be an interactive voice response (IVR) system, in which the authentication engine is implemented as an IVR device coupled to a telephony server and the authentication communications may be voice communications requiring interpretation by the IVR device.

In some example embodiments, the authentication system self-authenticates a user to perform transactions which require accessing protected resources. The user may request the authentication engine, or an IVR device in another embodiment of the invention, to calibrate a primary device and one or more secondary devices to the user for self-authenticating the user during a future authentication process. The calibration of each device may include such information as a means to contact the device and means to identify the device. During the authentication process, to confirm the identity of the requestor as the user, the authentication engine may send a request to the primary device to identify at least one of the secondary devices to send authentication data. The user, by means of the primary device, may reply back to the authentication engine with a means to identify one or more secondary devices. If the response includes the identity of one or more of the secondary devices previously calibrated at the authentication engine, then the authentication engine will transmit authentication data to the one or more secondary devices.

Once the authentication data is received at the one or more secondary devices, the user needs to access the one or more secondary devices to transfer the data to the primary device to complete the authentication process. The authentication data may be image, sound, video, text, or other such data. The one or more secondary devices are calibrated to present the data in a form that can be transferred to the primary device. In some embodiments, the transferring of the authentication data to the primary device may be performed by repeating the information into a microphone on the primary device, taking a photo of the data from the primary device, typing the information into the primary device, or transferring the data to the primary device using wireless modalities. In other embodiments, the authentication data received by one or more secondary devices is in the form of a question and, instead of transferring the authentication data to the primary device, an answer is transferred to the primary device. After the transfer is made to the primary device, the primary device may compare the received data compared against a known data accessible by the primary device, and if the data matches, the primary device may send a confirmation to the authentication engine.

BRIEF DESCRIPTION OF THE DRAWINGS

The foregoing will be apparent from the following more particular description of example embodiments of the invention, as illustrated in the accompanying drawings in which like reference characters refer to the same parts throughout different views. The drawings are not necessarily to scale, emphasis instead being placed upon illustrating embodiments of the present invention.

DETAILED DESCRIPTION OF THE DRAWINGS

A description of example embodiments of the invention follows.

Digital Processing Environment

Figure 1A:
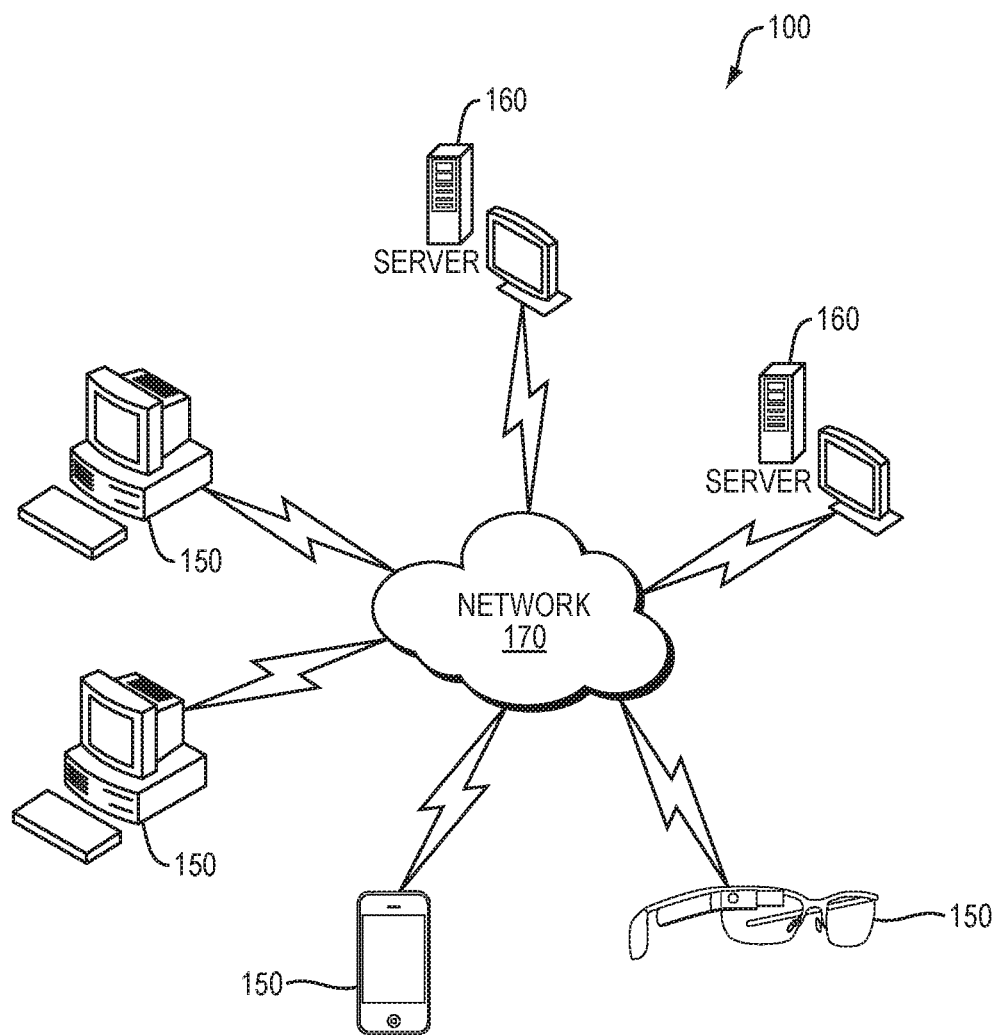
FIG. 1A is a schematic diagram of an example computer network environment in which embodiments of the invention are deployed.

Example implementation of a user identification system 100 (e.g. identity and access management solution) may be implemented in a software, firmware, or hardware environment. FIG. 1A illustrates one such example digital processing environment in which embodiments of the present invention may be implemented. Client computers/devices 150 and server computers/devices 160 (or a cloud network 170) provide processing, storage, and input/output devices executing application programs and the like.

Client computers/devices 150 may be linked directly or through communications network 170 to other computing devices, including other client computers/devices 150 and server computer/devices 160. The communication network 170 can be part of a wireless or wired network, remote access network, a global network (i.e. Internet), a worldwide collection of computers, local area or wide area networks, and gateways, routers, and switches that currently use a variety of protocols (e.g. TCP/IP, Bluetooth®, RTM, etc.) to communicate with one another. The communication network 170 may also be a virtual private network (VPN) or an out-of-band network or both. The communication network 170 may take a variety of forms, including, but not limited to, a data network, voice network (e.g. land-line, mobile, etc.), audio network, video network, satellite network, radio network, and pager network. Other electronic device/computer networks architectures are also suitable.

Server computers 160 may be configured to provide a user authentication system 100 which communicates with authenticators to confirm a requestor's identity prior to allowing the requestor to access resources protected by the authentication system. The server computers may not be separate server computers but part of cloud network 170.

Figure 1B:
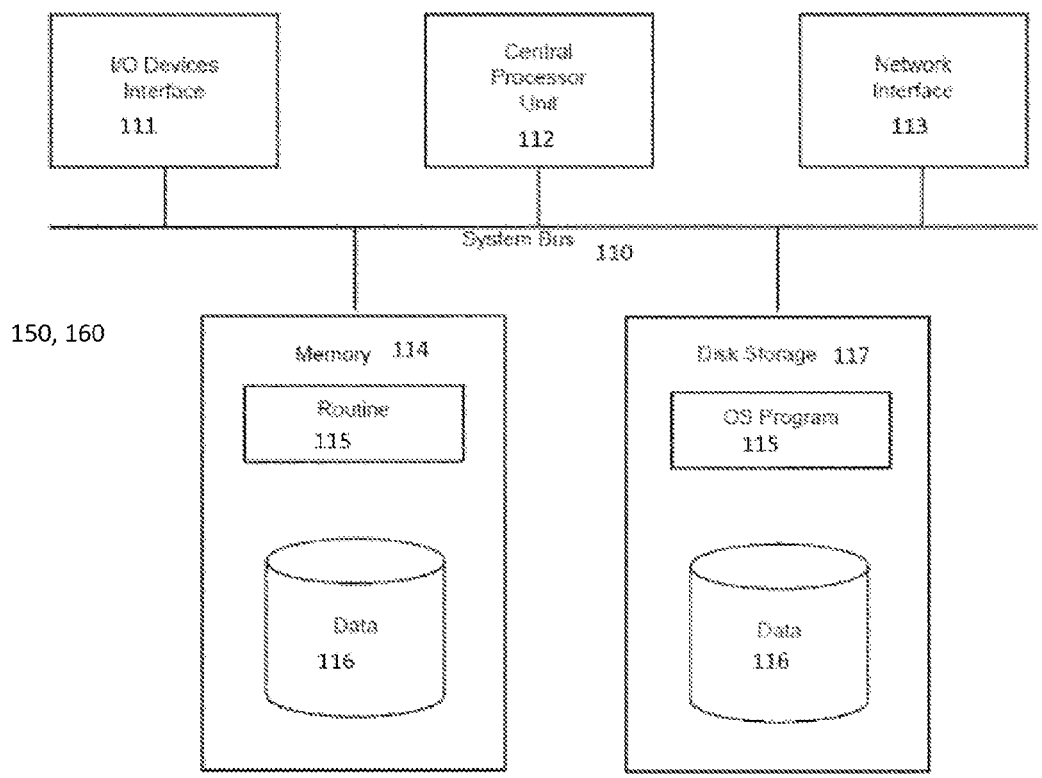
FIG. 1B is a block diagram of certain components of the computer nodes in the network of FIG. 1A.

FIG. 1B is a block diagram of any internal structure of a computer/computing node (e.g., client processor/device 150 or server computers 160) in the processing environment of FIG. 1A, which may be used to facilitate displaying audio, image, video or data signal information. Each computer 150, 160 in FIG. 1B contains a system bus 110, where a bus is a set of actual or virtual hardware lines used for data transfer among the components of a computer or processing system. The system bus 110 is essentially a shared conduit that connects different elements of a computer system (e.g., processor, disk storage, memory, input/output ports, etc.) that enables the transfer of data between elements.

Attached to the system bus 110 is an I/O device interface 111 for connecting various input and output devices (e.g., keyboard, mouse, touch screen interface, displays, printers, speakers, audio inputs and outputs, video inputs and outputs, microphone jacks, etc.) to the computer 150, 160. A network interface 113 allows the computer to connect to various other devices attached to a network (for example the network illustrated at 170 of FIG. 1A). Memory 114 provides volatile storage for computer software instructions 115 and data 116 used to implement software implementations of authentication components of the present invention (e.g. an authentication/attestation agent/engine 240, request handler 210, verification handler 220a, 220 b, and authentication engine 240, interactive voice response (IVR) system 184, portal 194 of FIGS. 1C and 2).

Software components 115, 116 of the user authentication system 100 (e.g. FIGS. 1A, 1B, 1C and 2) described herein may be configured using any programming language, including any high-level, object-oriented programming language.

The server may include instances of the authentication engine 240 (FIG. 2), which can be implemented as a client that communicates to the server 160 utilizing encrypted data packets (e.g. via SSL) and may compute a confidence score that provides a measure of confidence about the identity of a user of a computing device 150 based on, for example, communication with third party authenticators/attesters. For example, the system may include other instances of client processes executing on other client computers/devices 150, which allow the authenticators/attesters to receive and send communications in relation to authenticating a requestor as a registered user. In some embodiments, the computing device 150 identification may be implemented via a software embodiment and may operate, at least partially, within a browser session. In further web-based or app based example implementations, a request to authenticate a user may be received via a request handler 210, processed via an authentication agent/engine 240, as discussed in reference to FIG. 2.

In an example mobile implementation, a mobile agent implementation of the invention may be provided. A client server environment can be used to enable mobile security services using the server 190. It can use, for example, the XMPP protocol to tether a device authentication engine/agent 115 on the device 150 to a server 160. The server 160 can then issue commands to the mobile phone on request. The mobile user interface framework to access certain components of the system 100 may be based on XHP, Javelin and WURFL. In another example mobile implementation for OS X and iOS operating systems and their respective APIs, Cocoa and Cocoa Touch may be used to implement the client side components 115 using Objective-C or any other high-level programming language that adds Smalltalk-style messaging to the C programming language.

The system may also include instances of server processes on the server computers 160 that may comprise an authentication (or attestation) engine 240 (FIG. 2), which allow registering a user, selecting authenticators/attesters for confirming a requestor is a registered user, communicating with the authentications in regards to confirming a requestor's identity, and executing algorithms, such as statistical algorithms to compute confidence scores, to allow or deny the requestor access to resources protected by the system.

Disk storage 117 provides non-volatile storage for computer software instructions 115 (equivalently "OS program") and data 116 used to implement embodiments of the system 100. The system may include disk storage accessible to the server computer 160. The server computer can maintain secure access to records related to the authentication of users registered with the system 100. Central processor unit 112 is also attached to the system bus 110 and provides for the execution of computer instructions.

In an example embodiment, the processor routines 115 and data 116 are computer program products. For example, if aspects of the authentication system 100 may include both server side and client side components. In one example implementation of the system 100, an interactive voice response system (IVR) and related components as in FIG. 1C may be used to send messages to authenticators/attesters who have been selected to attest to the identity of a user. Computer readable software components of such an IVR system may be implemented, at least in part, in software 115, 116.

In an example embodiment, authenticators/attesters may be contacted via instant messaging applications, video conferencing systems, VOIP systems, email systems, etc., all of which may be implemented, at least in part, in software 115, 116.

In an example embodiment, the authentication engine/agent may be implemented as an application program interface (API), executable software component, or integrated component of the OS configured to authenticate users on a Trusted Platform Module (TPM) executing on a computing device 150.

Software implementations 115, 116 may be implemented as a computer readable medium capable of being stored on a storage device 117, which provides at least a portion of the software instructions for the user authentication system 100. Executing instances of respective software components of the user authentication system 100, such as instances of the authentication engine, may be implemented as computer program products 115, and can be installed by any suitable software installation procedure, as is well known in the art. In another embodiment, at least a portion of the system software instructions 115 may be downloaded over a cable, communication and/or wireless connection via, for example, a browser SSL session or through an app (whether executed from a mobile or other computing device). In other embodiments, the system 100 software components 115, may be implemented as a computer program propagated signal product embodied on a propagated signal on a propagation medium (e.g. a radio wave, an infrared wave, a laser wave, a sound wave, or an electrical wave propagated over a global network such as the Internet, or other networks. Such carrier medium or signal provides at least a portion of the software instructions for the present user authentication system 100 of FIG. 2.

Interactive Voice Response (IVR) System

Figure 1C:
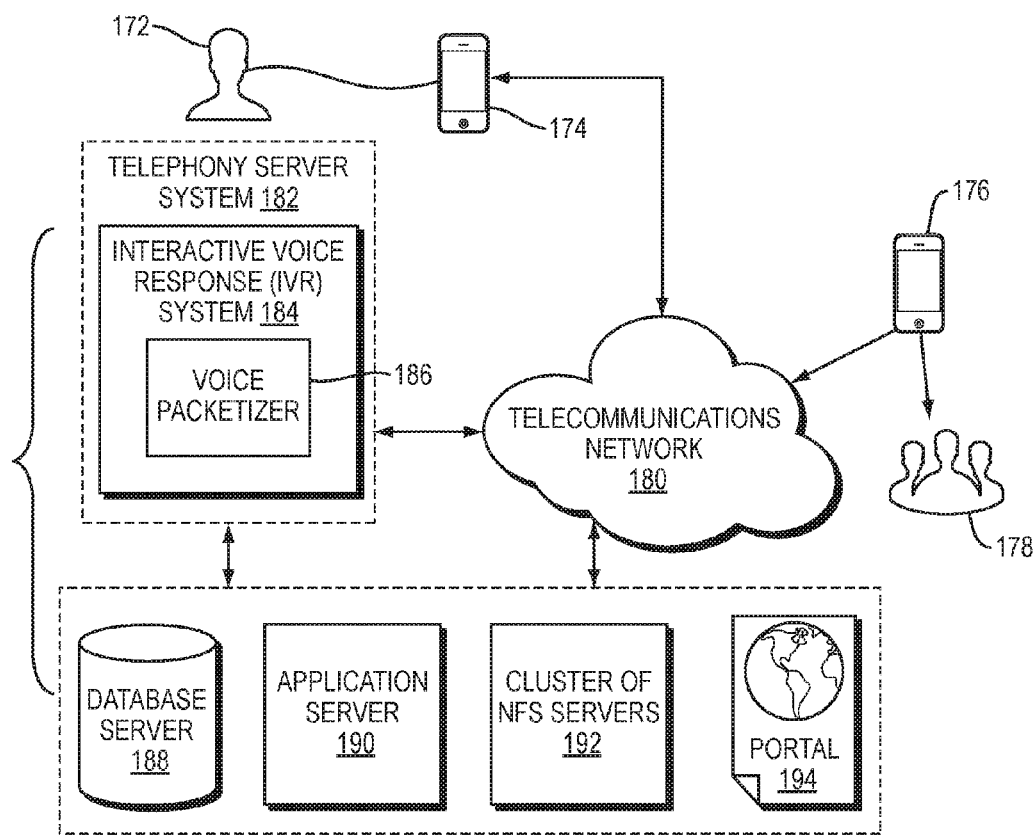
FIG. 1C is a block diagram of the network of FIG. 1A configured in an example embodiment as an interactive voice response (IVR) system.

FIG. 1C is a block diagram of an example implementation of certain components of the system 100 of FIG. 1A. In the example configuration in FIG. 1C, an interactive voice response (IVR) system is provided. In this embodiment, the user authentication system 100 is based on interactive voice response (IVR) technology. IVR is a telephony technology in which a user uses a touch-tone phone, speech recognition, or a mobile app to interact with a database to acquire information from the database or to enter data into the database. The requestor 172, by means of a voice device 174 (e.g. mobile phone, landline phone, video phone), may send a request (e.g. make a phone call) for protected information (e.g. bank account balance). The request may be received by the telephony server system 182 through the telecommunication network 180. The telephony server 182, may access information contained in the request, such as the destination phone number, and based on this information, may respond by prompting the requestor for security information (e.g. username, password, pin code). Once the user enters the security information, the telephony server 182, transfers this information out a port to an application server 190, implemented using a conventional application server computer platform and executing a standard application server operating system that provides for the execution of phone application programs.

The application server 190 may then pass this information to the database server 188 for further processing. The database server 188 may verify that the security information corresponds to an active account and provide this information back to the application server 190. Based on this response, the application server 190 may decide that additional security information may be needed to confirm the identity of the requestor. The application server 190 may request additional information from database server 188 or cluster of NFS servers 192, or may use a portal 194 to collect information from outside networks, such as the Internet.

Using the information received, the application server 190 may request the telephony server system to communicate across the telecommunication network 180 to contact an authenticator 178 by means of voice devices 176 (e.g. mobile phone, landline phone, video phone) to confirm the identity of the requestor. The telephony server may communicate with the authenticator (or multiple authenticators by means of multiple devices) and the requestor in the same voice or video session using conference calling technology. In other embodiments using the IVR system, the communication may be in a series of phone calls between the requestor and each authenticator, or the requestor may not be included in the communication, but a third-party representative or device may be included instead. Based on this communication, the authenticator 178, by means of voice device 176, may communicate a response to the telephony server system 182 (e.g. using the device keypad, device app, or speech); the response may confirm or deny the identity of the requestor. The telephony server system 182 may transfer the response to the application server 190 for processing and then, based on the response, the application server 190 may instruct the telephony server system to allow the requestor access to the requested information.

The telephony server system 182 may execute a computer telephony integration application that, in combination with the voice packetizer 186, preferably implements the interactive voice response (IVR) system 186 that allows the telephony server system 182 to effectively handle and respond to the voice communications.

Figure 2:
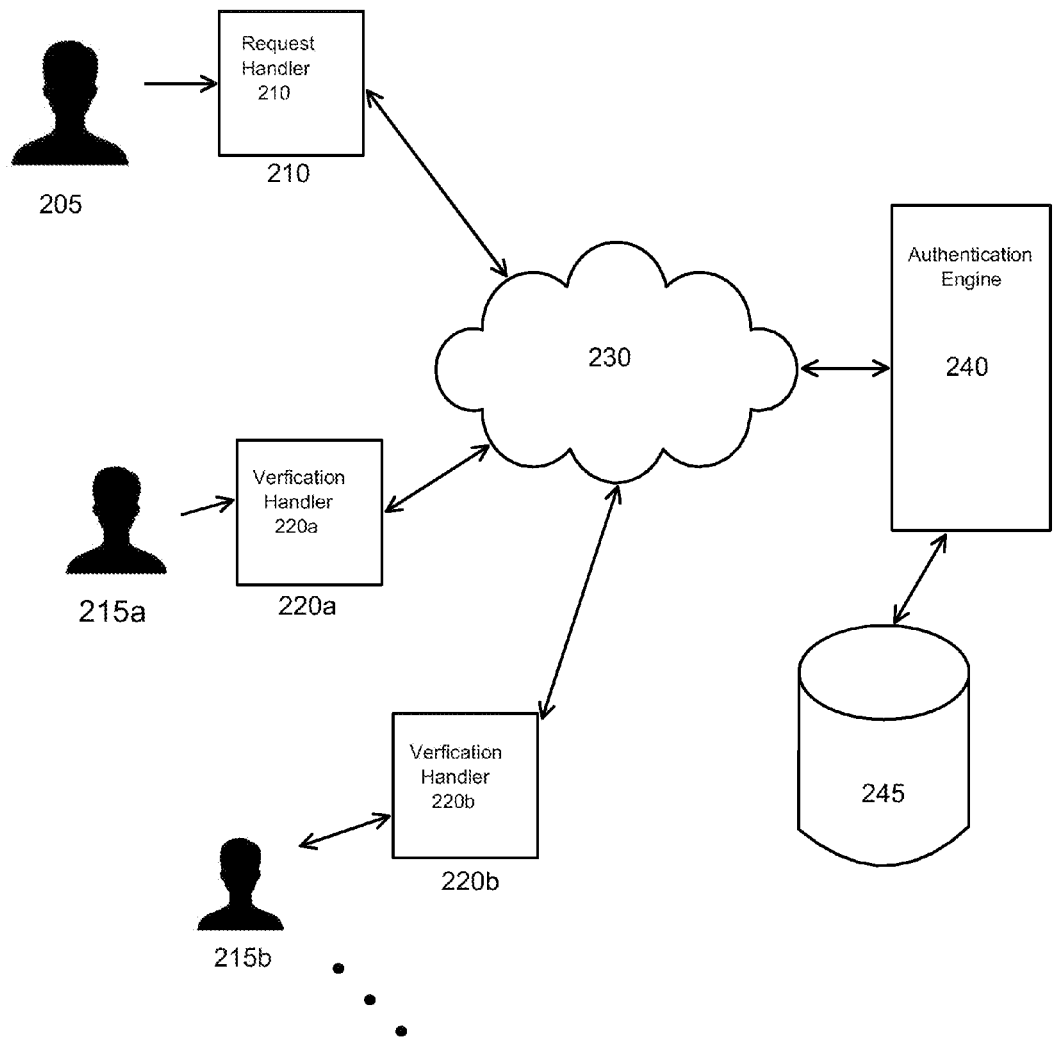
FIG. 2 is a block diagram of an example system for authenticating users.

FIG. 2 is a block diagram of one example implementation of the authentication system 100 according to an embodiment of the invention. A requestor 205, by means of device 210, 150, 160, attempts to make an online transaction which requires authentication to access virtual or physical resources protected by the system. Device 210, 150, 160 includes, but is not limited to, any computing or electronic device (e.g. personal computer, client processor, server processor, mainframe, wearable computing device such as Google Glass, laptop, tablet, mobile phone device, personal digital assistant, tablet, Bluetooth device, pager, land-line phone, camera, video camera, or any other network or computing device. The protected resources attempted to be accessed may be assets, purchases, services, content, documents, or other such resources, and may be accessed through websites, smartphone apps, radio, television, ATMs, or any other network accessible medium.

In the example authentication system, the requestor 205, by means of the user device 210, may communicate across a network 230 to the authentication/attestation engine or agent 240 to initiate the user authentication process. In one embodiment, the user device 210 may be a telephony device, such as a mobile or landline phone, and the authentication engine 240 may be a telephony server configured with an interactive voice response (IVR) system. In another embodiment, the network 230 may be a cloud such that the authentication engine 240 and memory storage 245 are not separate physical servers but all part of the telecommunication cloud network 180.

The requestor's transaction request may be transmitted to the authentication engine 240 to initiate the user authentication process. The authentication process may determine that the requestor is a new user that needs to be registered with the authentication system (e.g. setup an account), also referred to as onboarding. Alternatively, the requestor, by means of the requestor device 210, may initiate the onboarding process directly by sending a registration request to the authentication engine, without attempting to perform authentication. The onboarding process may then be initiated at the authentication engine 240 to setup a user account for the requestor. As part of the onboarding process, the authentication engine 240 may store authenticator records in memory 245 accessible to the authentication engine. These records contain information that may be used to contact authenticators 215a, 215b, by means of authenticator devices 220a, 220b, when a requestor attempts to access resources protected by the system. The authenticator information may be provided from the user, or may have been automatically determined by the authentication engine by searching the user's electronic files, accessing social and professional networking sites, searching one or more credit reporting databases, or other such means.

The requestor, instead, may have already registered as a user of the system but needs to be authenticated because: the system may require authenticators to confirm the identity of the requestor, the requestor forgot their login information (e.g. username, password), the requestor's login information expired, the particular transaction imposes heightened authentication, or for any other reason. Furthermore, the requestor's transaction may be part of ongoing transactions to the same resources, such as accessing secure images or documents stored in the cloud, or as a one-time transaction, such as registering for a credit card. However, the requestor may only be purporting to be a registered user in an attempt to gain unauthorized access to the protected resources for illicit purposes, such as to damage or steal the protected resources, and in such case should not be allowed access to the system.

If the requestor 205, by means of the requestor device 210, indicates that he is a registered user of the system, whether the requestor is registered or not, the authentication process may be initiated at the authentication engine 240 to confirm that the requestor is the registered user. As part of the authentication process, the authentication engine 240 may retrieve authenticator records from memory 245 and select one or more authenticators 215a, 215b attest to the requestor's identity. Once the authenticator process selects one or more authenticators, the authentication engine may communicate with the authenticators 215a, 215b, in serial or parallel, by means of the authenticator devices 220a, 220b. The authenticator devices 220a, 220b may include any computing or network device 150, 160, Bluetooth device, pager, land-line phone, camera, video camera, and the like.

The authentication engine 240 may communicate text, image, audio, video, forensics, or other such data to the authenticators as part of the process to confirm the requestor's identity. The authentication engine may communicate the data in real-time, such as in a video conference with the requestor present, or in delayed medium, such as in a text message or email. The one or more authenticators 215a, 215b, by means of authenticator devices 220a, 220b, then may respond to the authentication engine 240 to confirm or deny that the requestor is the registered user who he/she proclaims to be, and the authentication engine 240 may evaluate the one or more responses from the authenticators to either grant or deny the requestor access to the secure resources protected by the system.

"Trusted" Authenticators

Each authenticator may be assigned a respective level of trust (or trust score) by the system 100. For example, an authenticator may be considered highly "trusted" indicating that there is a high likelihood that authenticator provides accurate and trusted authentication. Trust factors using third party data may be considered in assigning a level of trust to an authenticator.

Example trust factors that may be considered in assigning a level of trust (or trust score) to an authenticator may include whether the authenticator is a 1st-degree connection of the requestor/user on a social media site (such as LinkedIn), whether the authenticator is in one or more of the requestor's/user's social circles (e.g. friends or family circles on Google+), whether the authenticator has been specifically designated as a family member or someone that the user/requestor is in a relationship with on a social networking profile of the requestor/user, whether the authenticator has recently communicated with the requestor/user via email, social media, text or electronic other means, and whether the requestor/user had specified that the authenticator was trusted during the initial onboarding process.

Data models may be built for each authenticator associated with the user/requestor, which are used to facilitate computation of the confidence level/score. The data models may include statistical information related to the authenticator. For example, a ratio indicating the frequency with which the requestor/user and the authenticator communicate with one another, over a period of time, may be included. A correlation index indicating the likelihood that authenticator is trusted, as compared to an average user profile of an untrusted authenticator, may also be determined. In this way, the authenticator trust factors, the determined communication frequency ratio, determined correlation index, and related data, may be factored in to compute a trust level or trust score for the authenticator and used to build an associated data model for that authenticator.

User Onboarding Examples

Figure 3A:
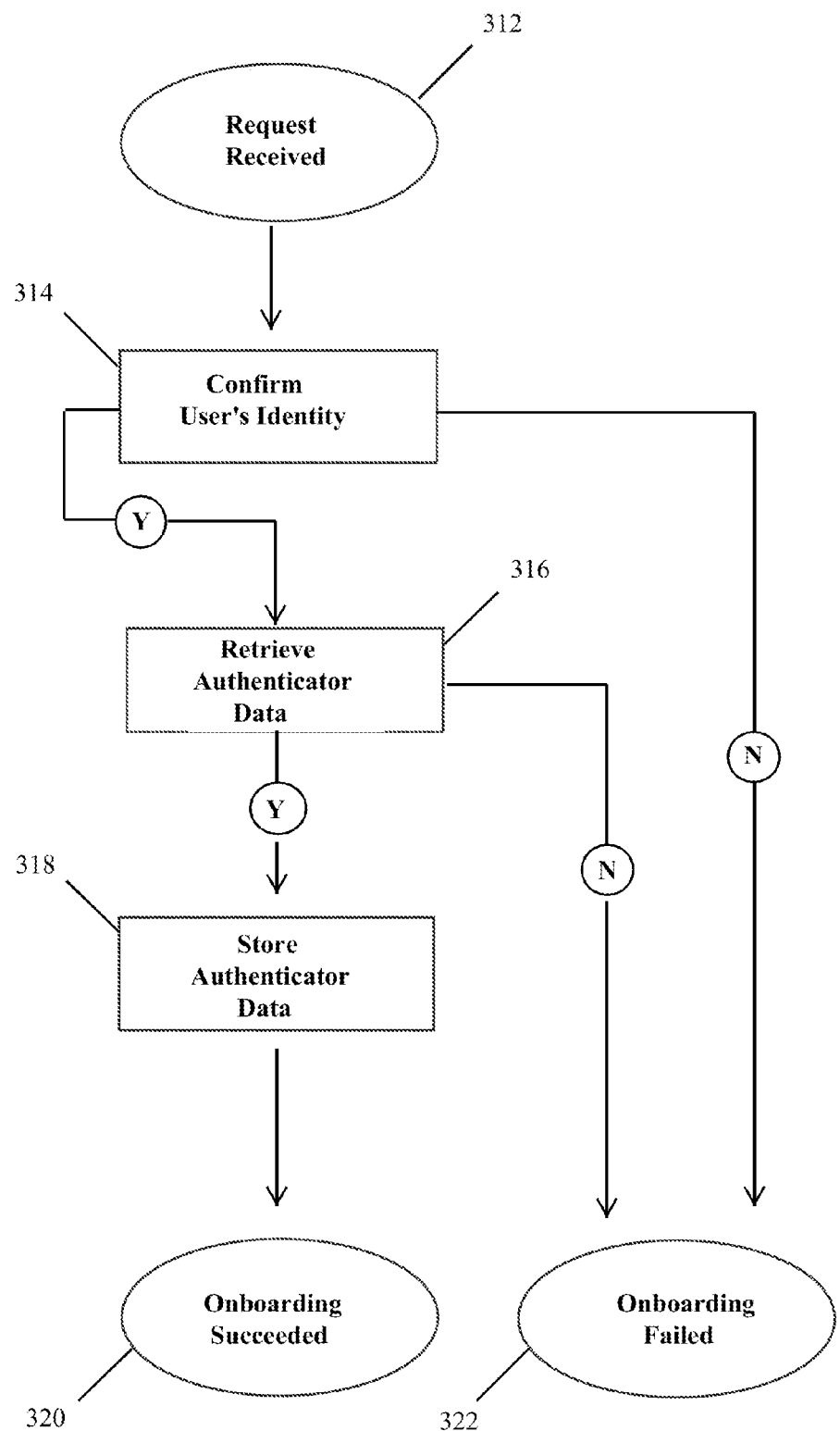
FIG. 3A is a flow diagram of an example user onboarding process.

FIG. 3A is a flow diagram of an example user onboarding process according to an embodiment of the invention. In this embodiment, a user requests to register (onboard) with the authentication system 100 in order to make one or more future transactions (or request access), which require authorization. The authentication engine 240 receives a user request 312 from the user 205 by means of the user device 210, 150. As part of the onboarding process, the authentication engine 240 may first perform an initial confirmation of the user's identity 314.

Figure 3B:
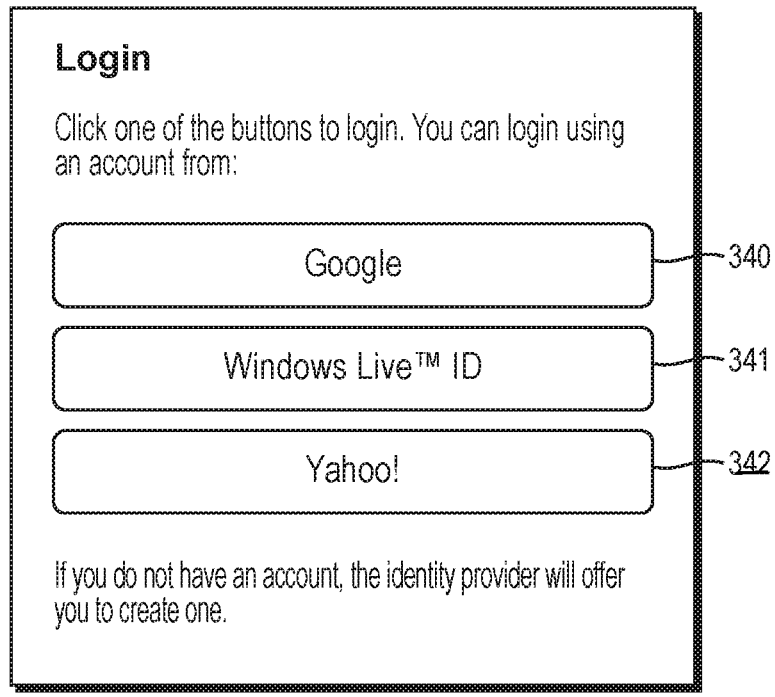
FIG. 3B is an example interface showing pre-existing accounts that may be linked during the onboarding process.

The requestor/user may choose to setup a new account with the authentication system or may login using third party pre-existing accounts (e.g. email, social networking, business) including, but not limited to, LinkedIn, Gmail, Yahoo, Hotmail, Facebook, Twitter, Google, Dropbox, Quora, Pinterest, Vimeo, or Netflix. (See, e.g. FIG. 3B for an example interface showing sign-in options to example pre-existing accounts 340, 341, 342, which may be linked during the user onboarding process.) Preferably, several of the user's/requestor's preexisting accounts are selected and linked in the initial confirmation process as being associated with the user. Existing contacts and data associated with the requestor/user's social profiles may be accessed and stored by the system during the onboarding process.

By linking third party pre-existing accounts, the authentication system is able to gather third party held information and third party contacts associated with the requestor/user, which can be used to augment the authentication process of the user with a high degree of confidence.

To further facilitate confirming the user's identity, for instance, the authentication engine may collect text, images, audio, visual, or other data from the user, in a variety of forms including, but not limited to, text, photos, voice prints, videos, or handwriting. The data may be collected in real-time during the onboarding process via linked third party accounts or in delayed time from the user. For example, the authentication engine may in real-time record the voice and images of the user during a video call, or may record answers to questions posed to the user during a phone call.

In another example, the authentication engine may request that the user upload or send recorded images, voice prints, videos, answers to questions, or such to the authentication engine in a text messages or email within a specific delayed period of time. The authentication engine may also automatically collect data regarding the user by importing the user's contacts, messages, calendar, social media data and other electronic data through any linked third party accounts.

In another embodiment, the authentication engine may also automatically collect data regarding the user searching the user's electronic files (e.g. phone/address book, phone record, text messages), searching one or more credit reporting agency databases (e.g. Experian), or other such means. The authentication engine may also have a third-party service collect data samples from the user, such as taking photos, voice prints, videos, handwriting samples, fingerprints, dental prints, blood, DNA, or any other such samples.

The authentication engine may use the collected data to confirm the user's identity. The authentication engine may contact one or more individuals associated with the user, such as friends, family, school mates, colleagues, and present some or all of the collected data. The contacted individuals may have been provided by the user, or may have been automatically determined by the authentication engine by searching the user's electronic files, accessing social and professional networking sites, searching one or more credit reporting agency databases (e.g. Experian), or other such means. The individuals may be contacted using delayed communication methods, such as a text message or email, and sent some or all data collected during the onboarding process. The individuals may instead be contacted using live communication methods, such as a phone call, video call, conference call. The user may be present during the live communication and the individuals may be able to interact with the user or may only be able to hear or see the user. A third-party (e.g. authentication system representative or device) may also or instead be present during the call to present data collected during the onboarding process to the individuals.

The authentication engine may use other means to initially confirm the user's identity as part of the onboarding process. The authentication engine may communicate with virtual or physical devices to identify the user. For example, the authentication engine may communicate with an image processing device to compare a picture or video collected from the user against an image or video of the user obtained from a social or professional networking site. Om another example, the authentication engine may search one or more credit reporting agency databases (e.g. Experian) to compare answers from questions posed to the user during the onboarding process against known (public or private) data regarding the user.

The authentication engine may also communicate with third-party services to identify the user, such as credit reporting agencies (e.g. Experian). For example, collected data for the user, such as collected handwriting or blood samples, may be transmitted to a third party, such as a forensics lab. The third-party service may then analyze the collected data against known data for the user, such as from the user's medical files or other forensic files, and communicate the results back to the authentication engine.

In another example, the authentication engine may utilize traditional mail or package delivery services (e.g. United States Postal Service, Federal Express, or United Parcel Service) to send a certified letter or package or similar service requiring positive identification for delivery with receipt returned via the traditional mail or package delivery service or by automated means such as the data interfaces offered by the delivery services to provide electronic confirmation. The record of the delivery may be used by the authentication engine to confirm the user's identity, since the delivery service would only release the certified post or similar delivery to the user after visual verification of the user's identity. For example, a delivery service may offer a verified delivery option which, if selected on a data interface (e.g., check a box on data interface), would require the delivery service to check reliable identification (e.g. government issued ID) prior to releasing the mail or package. There may also be information contained in the certified post that the user must communicate back to the authentication engine as part of the verification process. A similar verification procedure may be conducted through any other business or organization that confirms an individual's identity prior to delivering a product or service.

In a further example, the authentication engine may send an electronic notary service (e.g., e-notary) a document with the user information to be verified (e.g., name, address, birth date). The document may be sent to the service through electronic mail, a data interface, or other such means. The service may receive the document and arrange for a notary to meet the user (e.g., at the user's house, at the user's place of business, or at the notary service office). At the meeting, the notary checks reliable identification for the user (e.g. government issued driver's license or passport), then has the user sign the document and notarizes the signature. The document is then returned to the authentication engine in electronic format. The entire process may be completed with the document in electronic format, or the document may be printed, signed/notarized, and scanned back into electronic format before transmitting back to the authentication engine.

For the onboarding process, the user may be assigned a respective confidence score by the system 100. For example, a user may be considered highly "trusted" indicating that there is a high likelihood that the user is who he claims to be. The trust score may be calculated based on the level of trust of each individual confirming the user's identity. For example, the confidence score may be based on an individual's relationship to the user (e.g. friend, family, or colleague), how often an individual communicate with the user, whether an individual is a 1st-degree connection of the user on a social media site, and based on confidence scores calculated for the individuals in regards to other accounts on the system. The confidence score may also include the other factors used in confirming the user's identity, such as data verified by third-party devices and services.

As part of the onboarding process, the authentication engine may then configure one or more authenticators for confirming future requestors accessing the system as the user are actually the user. An authenticator may be a human trustee that has an association with the user, such as family, friends, colleagues, or school mates. The authentication engine may retrieve authenticator data 316 corresponding to an authenticator from various sources. The authentication data may be provided from the user, or may have been automatically determined by the authentication engine by searching the user's electronic files, accessing social and professional networking sites, searching one or more credit reporting databases, or other such means. The authenticators may or may not include the same individuals used to initially confirm the user's identity. The authenticators may also be virtual or physical devices that may confirm the identity of the user from textual, audio, visual, forensics, or other samples. For example, the device may be an image processing device which compares a picture or video collected from the user during onboarding against an image or video of the user captured during the authentication process. The authenticators may also be a third-party service, such as a lab, which may analyze data collected at onboarding, such as fingerprints or DNA, against data collected during the authentication process or from other user records, such as medical records.

The authenticators may also include the user himself who can confirm his/her own identity during future transactions through a self-authentication process. As such, the user may calibrate a primary device, such as a mobile phone, for the authentication engine to contact during the authentication process. The user may then calibrate one or more secondary devices, such as a mobile phone, tablet, computer, fax machine, pager, or television, which may be used for self-identification during a subsequent self-authentication process. As part of calibrating these devices, the user may specify the means of contacting the device, such as a phone number or web address, and a means for identifying the device, such as a nickname or serial code. During the authentication process, one or more of the devices must be in close proximity to the user because communications may need to be transmitted between the primary and secondary devices to confirm the identity of the user.

The authentication engine may store authenticator data 318 related to each authenticator as a record in memory 245 accessible to the authentication engine 240. The authenticator records may be stored compressed, hashed, encrypted or in another such digitally altered format. To create a record for an authenticator, the authentication engine may request from the user or third-parties information related to the authenticator. This information may include contact information for the authenticator, such as phone number, email address, web address, and rules for contacting the authenticator, such as preferred method to contact, times to contact, order to contact. The information may also include relationship information, such as how an authenticator knows the user or for how long, and the type of verification information to be presented to the authenticators to identify the user. The information may also include verification information to be presented to the authenticator for confirming the authenticator's own identity. The verification information (for both the user and authenticator) may include text, images, audio, visual, or other data from the user, such as text, photos, voice prints, videos, handwriting, or questions/answer. The verification may be collected in real-time, such during a video call, or delayed time, such as images sent in an email or text message in a specified period of time. The authentication engine may also automatically collect data regarding the user by searching the user's electronic files (e.g. phone/address book, phone record, text messages), accessing social and professional networking sites (e.g. LinkedIn, Facebook, Twitter), searching one or more credit reporting agency databases (e.g. Experian), or other such means. The authentication engine may also have a third-party service collect data from the user, such as taking photos, voice prints, videos, handwriting samples, fingerprints, dental prints, blood, DNA, or any other such samples. In regards to the verification information for the user, the information may or may not include the same information collected when initially confirming the user's identity. The data records may also be stored in a bitcoin block chain transaction, or similar technology, to be used during future authentication processes to verify that the data records have not been modified.

If the onboarding succeeded and the user's identity is confirmed at 320, then one or more authenticators are configured for authentication. Otherwise, the authentication engine may determine onboarding failed 322 and the user may not attempt to access resources protected by the authentication system.

User Authentication Examples

Figure 4:
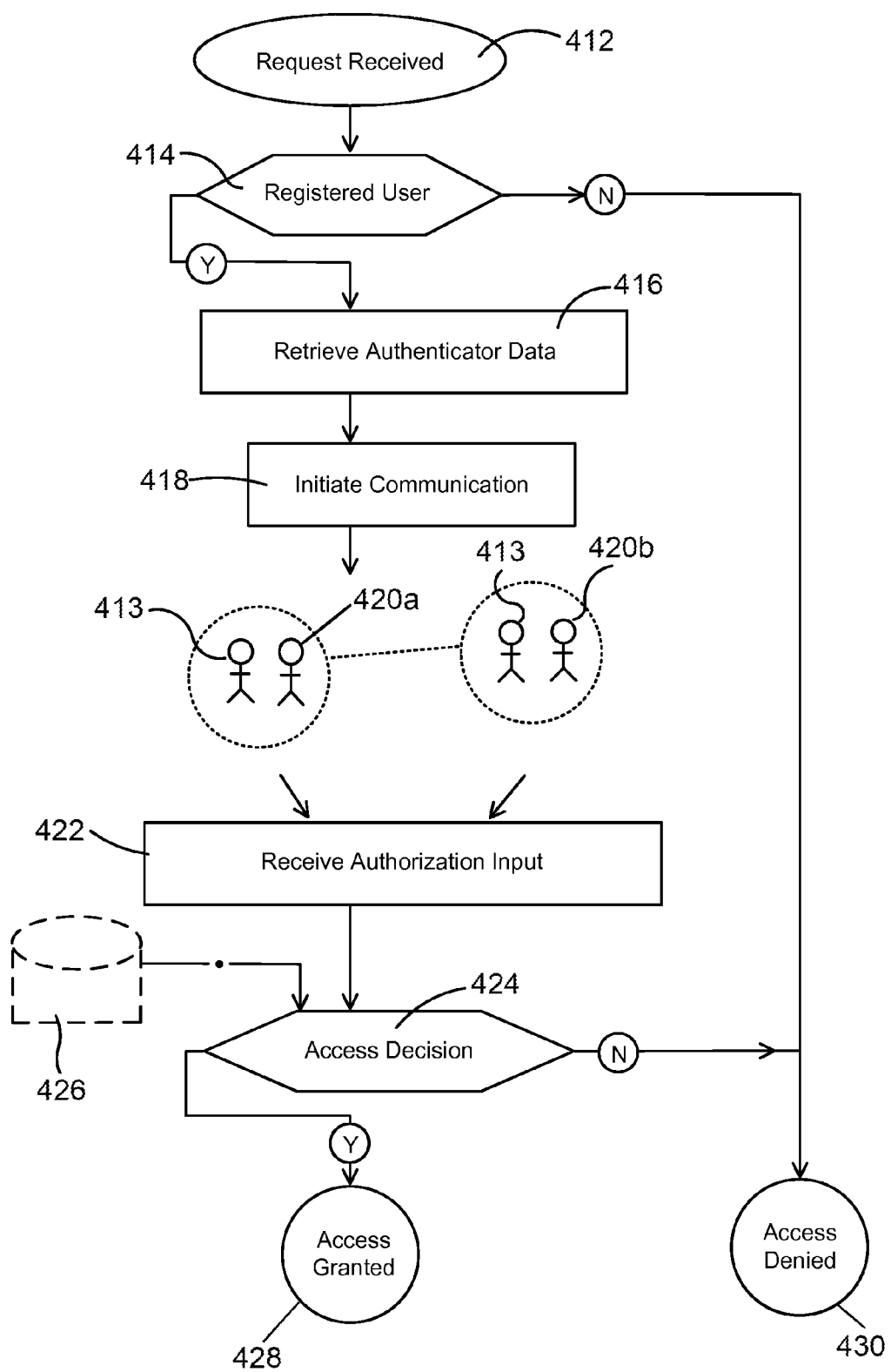
FIG. 4 is a flow diagram of an example user authentication process.

FIG. 4 is a flow diagram of an example user authentication process.

A requestor 205, by means of device 210, attempts to make an online transaction which requires authentication to access protected virtual or physical resources. The requestor's transaction request may then be communicated to the authentication engine 240 to initiate the authentication process to confirm that the requestor 205 is a registered user of the system. The requestor's transaction request may include account information, such as a username, password, pin code, or similar such information. The authentication engine may receive the transaction request 412, and using the information provided in the request, determine that the request is in regards to an existing user account for a registered user of the system 414. The authentication engine may also determine that the information provided does not correspond to any existing user account and may either ignore the request, notify the requestor that the request is invalid, prompt the requestor to create a new user account, or take another such action. The request received 412 may also be a registration request to create a new user account, and an embodiment of the onboarding registration process, such as the embodiment previously described, may be initiated to register the requestor. If the request is an authentication request in regards to an existing user account, the authentication engine may start the authentication process to confirm that the requestor is indeed the registered user of the existing user account indicated in the request.

As part of the authentication process, the authentication engine may use the information in the requestor's transaction request to retrieve authenticator data records 416 corresponding to the user account indicated in the request. The authenticator data records may have been created as part of the onboarding process for setting up the user account. The information from the data records may also have been stored in a bitcoin block chain transaction and the data records may be compared against the secure block chain data to verify that the data records have not been modified or tampered, whether mistakenly or illicitly. The authentication engine may consider the authenticator data records to determine one or more authenticators 220a, 220b to contact to confirm that the requestor is the registered user. The authenticator records may indicate pre-selection criteria for selecting authenticators, such as all authenticators are contacted, certain authenticators are contacted (with the rest as backup), a methodology for selecting and ordering authenticators, or other such pre-selection criteria. The authenticator records may also indicate that only certain authenticators are available for authenticating the requestor (e.g. time restrictions or transaction type restrictions) based on information stored in authenticator records. The authentication engine may then use one or more algorithms to select from the available authenticators. For example, the authentication engine may use probabilistic algorithms to calculate a confidence score to statistically rank the available authenticators based on various factors, such as the frequency the user communicates with the authenticator, relationship type (e.g. family, school mate, colleague), degree of separation as calculated by third-party sites (e.g. LinkedIn). In some embodiments, the confidence scores for each authenticator may already be calculated during the onboarding process and stored as part of the authenticator record for use during the authentication process and updated from time to time or the confidence score may be calculated in real-time as needed.

The authentication system may also support different security levels in which different transactions may require different levels of authentication based on various factors, such as the sensitivity of the data being accessed or the risk of deviant behavior. As such, certain authenticators may only be eligible for certain transactions based on the confidence scores calculated for the authenticators. For example, an authenticator may be eligible to confirm the requestor's identity for a transaction involving a bank account deposit but the same authenticator may not be eligible for a transaction involving a bank account withdrawal. In addition, a greater number of authenticators may be required for certain transactions based on the confidence scores. Furthermore, based on the required security level, only certain authenticators may be eligible because of the methods for which those authenticators are configured to interact with the requestor. For example an authenticator configured for video calls with the requestor may be selected instead of an authenticator configured for voice-only phone calls with the requestor. Based on such factors, the authentication engine may select one or more authenticators to confirm the identification of the requestor as the registered user.

Once one or more authenticators are selected, the authentication engine may initiate communications 418 with the authenticators 420a, 420b, by means of authenticator devices 220a, 220b, to confirm the requestor's identity. If an authenticator is not available when the authentication engine attempts to contact him, the authentication system may instead contact another authenticator or may use a reduced number of authenticators. For each of the available authenticators, the authentication engine may select the mode of communicating with the authenticator based on the information stored in authenticator records. Based on the selected mode, the communication may require certain components to be present on the authenticator device 220a, 220b, such as a camera, microphone, speaker, or video display. If the requestor is also involved in the communication then the requestor's device may also require such components. Based on the selected mode, the authentication process may be conducted in real-time or over a deferred period of time. In a time delayed-deferred authentication example, if the mode is a live telephone or video call, the authentication session occurs as a real-time conversation in which a decision may be made during the conversation on the identity of the requestor. Alternatively, for example, if the selected modality is via email or text message, which may include an accompanying image, video, or voice sample, the decision may be deferred and may allow the authenticator to respond within a predetermined or specified amount of time.

The authentication process may select certain data to present to one or more authenticators to confirm the requestor's identity as the user. The authentication process may select to present text, images, video, audio, forensics, questions/answers, and other such data to the authenticator. The data may be stored data from the authenticator record, may be requested from the requestor as part of the authentication process, or some combination of both. The data may also be automatically collected during the authentication process by the authentication engine searching the user's electronic files (e.g. phone/address book, phone record, text message), accessing social and professional networking sites, or searching one or more credit reporting agency databases. The image, audio, video, and other such data may be previously recorded, either at the time of user registration or earlier in the authentication process and played back to the authenticator for verification purposes. The audio, video, and other such medium may also be live in which one or more microphones, video cameras, or other such equipment may be streaming sounds and images of the requestor, the requestor's surrounding environment, or both to the authenticators for verification purposes. The live communications may allow the requestor 413 to interact with the authenticators 420a, 420b, such as to ask questions, or the live communications may only involve the authenticators observing the sounds and images related to the requestor. The communication may occur solely between the requestor and the authenticator or an individual or device associated with the authentication system (administrator or device) may also be involved in monitoring the communication. This data may be presented to the authenticators simultaneously as a group (e.g. in a conference call) or may be presented to each authenticator individually either in parallel or in a sequential order. The communication between the requestor and the authenticator may have a set amount of time, or may end when the authenticator indicates the authenticator has enough information to make an evaluation.

If the user account was configured for self-authentication, the authentication engine may initiate communications with the registered user through primary and secondary user devices calibrated to the user's account during onboarding. The authentication engine may make an outbound communication connection to the user's primary calibrated device, such as a mobile phone. Once connected, the authentication engine may then prompt the user, by means of his primary device, for information used to select one or more of the user's secondary devices, such as a nickname for each device, or the authentication engine may automatically select one or more of the user's secondary devices. The authentication system may then transmit communications to the user's secondary device, such as images, sound or voice, or questions. The requestor must have access to the one or more secondary devices, (e.g. the requestor may need to be in close proximity to the devices) and the requestor must have logon credentials for the devices, to transfer the received data from the secondary devices to the primary device. The transfer of information from the secondary device may be performed by means such as repeating the information into a microphone on the primary device, taking a photo of the data with the primary device, typing the information into the primary device, or transmitting the data to the primary device using one or more wireless modalities including, but not limited to, Bluetooth, Near Field Communication (NFC), radio frequency identification (RF Id), or WiFi. The data sent to a secondary device may also be in the form of a question, and the user may need to input the answer into the primary device using such means as described. Once the primary device receives the transferred data, the device may communicate a confirmation to the authentication engine to successfully complete the process, either automatically, if the device has been calibrated to do so, or manually via input from the user required to communicate the confirmation.

Once the verification information is presented to the one or more authenticators, the authentication engine may receive authorization input 422 from the authenticators regarding the requestor's identity. Each authenticator may decide to confirm or deny the requestor's identity as the registered user and specify the level of confidence in the decision. The authenticator's decision and confidence level may be input to the authenticator device by various means, such as a keypad, mobile app, speech, text message, email, a graphical interface, or other such means, and the authenticator device communications the decision and confidence level to the authentication engine. In one example embodiment, the authentication engine may be an interactive voice response (IVR) device in which the authenticators may interact with the IVR using a telephone keypad or by speech recognition through the authenticator device, such as a mobile phone, to indicate the authenticator's decision. In another embodiment, an authenticator may contact a human representative to indicate the authenticator's decision. Furthermore, the requestor may or may not witness the decision of an authenticator, or even be notified of an authenticator's decision. For example, if a conference call with the requestor is the method to present data to the authenticator, the authenticator may express his decision with the requestor still on the call or may wait until the requestor leaves the call to express his decision. The authenticator may only have a certain period of time in which to provide the authenticator's response. For example, the authenticator may need to express his decision before leaving a conference call or may have fifteen minutes after the end of a conference call to communicate a decision to the authentication engine using another means, such as a text message.

After receiving the authorization input from the authenticators, the authentication engine may access a decision 424 on the identity of the requestor. The decision may be based on evaluation algorithms performed at the authentication engine using some or all of the received responses. The decision may allow the requestor to access all the secured resources protected by the system, a portion of the secured resources, or none of the secured resources. The decision may also allow the requestor to access the protected resources for one transaction, for a determined number of transactions, or allow ongoing access for a specific period of time.

Confidence Scoring

Figure 5:
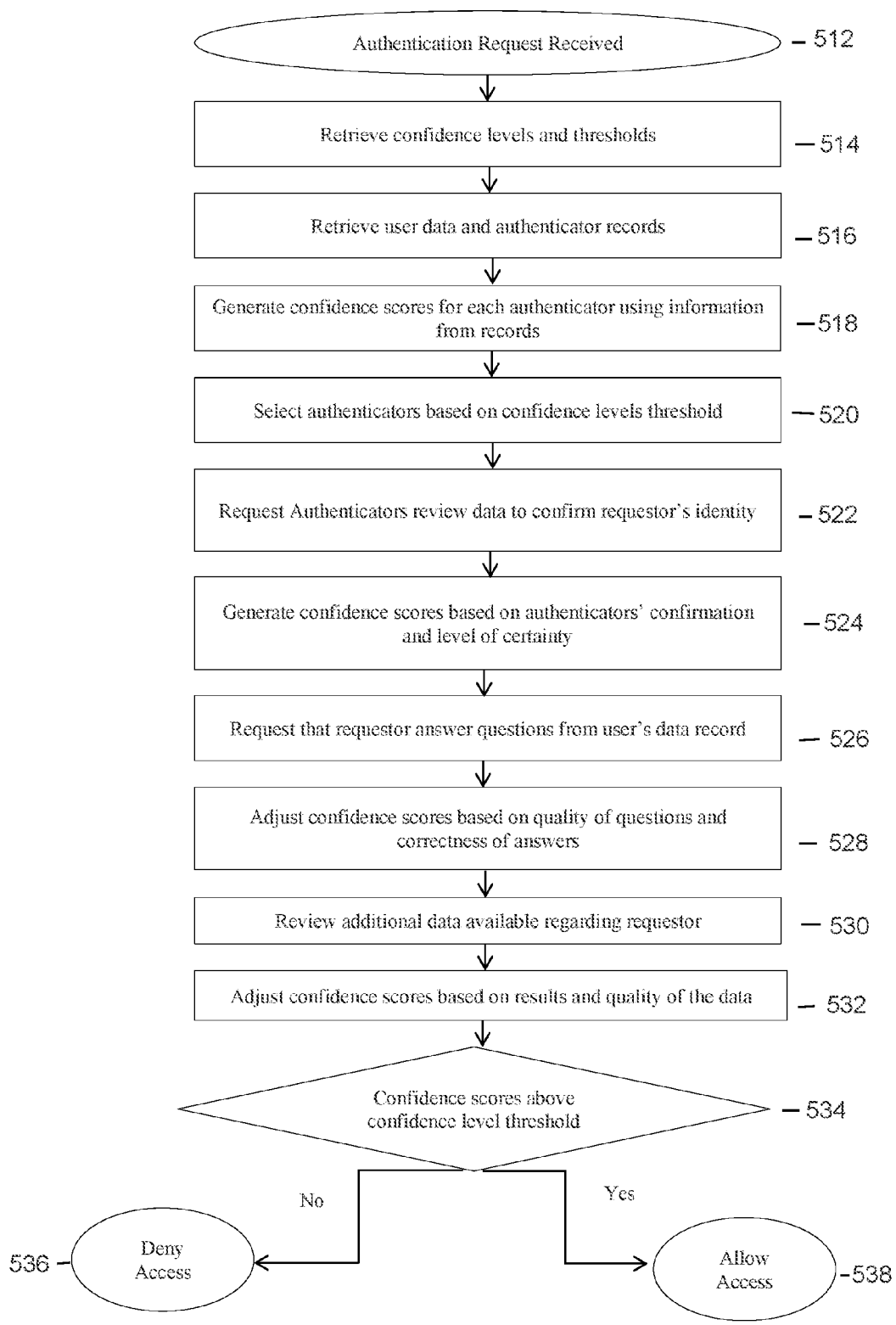
FIG. 5 is a flow diagram of an example confidence scoring process.

FIG. 5 is a flow diagram of an example evaluation algorithm using confidence scores. A requestor 205, by means of device 210, attempt to make an online transaction which requires authentication to access protected virtual or physical resources. The requestor's authentication request 512 may be received at the authentication engine 140 to initiate the authentication process. After receiving the authentication request, the authentication engine may retrieve confidence levels and thresholds 514, which define the acceptable statistical and probabilistic risk of fraudulent access to the protected resources of the system. The authentication engine may then retrieve user data and authenticator records 516 from memory accessible from the authentication engine. The authenticator records may contain information in regards to one or more authenticators configured to confirm the requestor's identity as the user. This information may include the methods for the authentication engine to contact an authenticator, an authenticator's relationship to the user, the last time an authenticator communicated with the user, how frequent the authenticator communicates with the user, and data that the authentication engine may present to the authenticator to confirm the user's identity. The information may also include data that the authentication engine may present to the authenticator to confirm the authenticators own identity.

Prior to selecting authenticators to confirm the requestor's identity, the authentication engine may generate confidence scores for each authenticator 518. The confidence scores may be calculated using a variety of methodologies, including statistics, probabilities, or other means. The confidence scores may be generated by retrieving stored confidence scores or calculating confidence scores in real-time 518. A high degree of confidence may be assigned to the authentication of the requestor if the authenticator confirms the identity of the requestor and the authenticator is considered to the "trusted" based on a high trust score. In order to calculate the trust score of an authenticator, the authentication engine may first collect information regarding the authenticator. The information may be from the authenticator recording corresponding to the authenticator, including images, voice, video, forensic, or other data, which can be compared against data collected during the authentication process. For example, during the authentication process an image or voice sample may be taken during a video or phone call with the authenticator, and if it matches the image or voice print of the authenticator stored in the authenticator record, the trust score for the authenticator may be increased. In another example, the authenticator may be asked questions and the answers and depending on how the answers compare in correctness compared to information in the authenticator record or information retrieved from a credit reporting agency database, and the quality of the questions, an authenticator's trust score may be adjusted. Furthermore, the authentication engine may access social or professional network sites, such as considering the degree contact ranking (e.g. first degree contact) of the authenticator and the user on LinkedIn and frequency of contact, or whether the authenticator is in the user's "friends" and "family" circles on Google+, and the trusted score may be adjusted accordingly. The authentication engine may also consider whether the authenticator is also a user of the authentication system or is an authenticator for another user of the system, and evaluate information known about the authenticator in regards to those accounts (e.g., accuracy in other authentication transaction or confidence scores generated in regards to other accounts). After calculating a confidence score from each authenticator based on such information, the authentication engine may select authenticators based on confidence levels thresholds 520 (e.g. confidence score above confidence level threshold required for the requested transaction).

The authentication engine may then request the selected authenticators to review data to confirm the requestor's identity 522. After reviewing the data, each authenticator may confirm or deny that the requestor is the user and may indicate a level of certainty in their decision. The authentication engine may then generate a total confidence score on the identity of the requestor based on the response of all the authenticators 524, including both the confirm/deny response and the level of certainty. The authentication engine may also considering other factors to adjust the confidence score, such as the method that the requestor was contacted (e.g. communicating with the requestor over video instead of phone may increase the confidence score), or the confidence score calculated for the particular authenticator (e.g. higher confidence score for authenticator increases the confidence score for the confirmation).

The authentication engine may then adjust the confidence scores based on other factors apart from the response from the authentications. The authentication engine may request that the requestor answer questions from the user's data record 526, and may adjust the confidence score based on quality of questions and correctness of answers 528. The authentication engine may also review additional data available regarding the requestor 530, such as comparing fingerprints, DNA, voice prints, images, video, comparing the data to samples stored for the user, and adjust the confidence the confidence score based on the results and quality of the data 532. Once all the data is considered, and confidence scores calculated and adjusted accordingly, the authentication engine may compare the confidence score to a confidence level threshold for confirming the requestor's identity as the user 534. Based on this comparison, the requestor may be denied access 536 or allowed access 538 to the protected resources.

In alternative embodiments, the authentication engine may utilize an evaluation algorithm that may consider the responses from all or a sub set of the one or more authenticators. The algorithm may determine whether to allow access to the requestor based solely on the number of authenticators that confirmed the requestor's identity as the registered user and their level of confidence in their decision. For example, if more than 90% of the authenticators confirm the requestor's identity, then the requestor may be allowed access. If there is more than one authenticator, the algorithm may instead weigh the decisions of each authenticator, such that the decisions of some authenticators may have more weight than other authenticators. The authenticators may be weighed based on factors, such as having a stronger relationship with the user or the mode of confirming the requestor's identity (e.g. having a video conference with the requestor instead of receiving a text message).

The evaluation algorithm may also consider additional data stored in memory 426 accessible to the authentication engine when analyzing the requestor's identity. For example, a voice print or image of the requestor may be collected during a call with the authenticator and compared with a voice print or image of the registered user stored during onboarding or from other successful authentication sessions. In addition, the collected voice print may be analyzed for accents, inflections, words, tones that may support or reduce the likelihood that the requestor is the registered user or the collected image may be analyzed for markings, eye color, or hair color. A third-party service may also be used to analyze collected data (e.g. fingerprints, dental records) against data collected during the onboarding process, or within other successful authentication sessions, or in other public or private records for the user, such as from the user's medical files or other forensic files, and communicate the results back to the authentication engine. In another example, the requestor may respond to one or more security questions, which may be considered by the evaluation algorithm. Such additional data may be included in the calculation of the confidence scores or may be considered in conjunction with the confidence scores. The additional data may be so compelling, for example, DNA collected from the requestor during the authentication process matching DNA collected from the user during the onboarding process, that the additional may be considered alone to confirm the requestor's identity as the user.

Analytics for Authenticators

Information related to authentication test/factors used in the calculation of a trust score, including historical information regarding past authentication processes in which the authenticator was used to verify the requestor/user can be used to improve the quality of the trust scoring process applied to the authenticator. For example, an analytics tool (such as a web analytics tool or BI tool) may produce various metrics such as measures of each authenticator's responsiveness and authentication success based on a combination of other criteria (e.g. environment variables associated with the authenticator), and filter these results by time of the day or time period or means of contacting the authenticator, such as by SMS, email, voice, video. Such measures can be viewed per authenticator to help improve the quality of the computation of confidence and trust scores because the results may be aggregated across a multitude of authenticators.

Furthermore, analytics data for a calculated trust/confidence score for an authenticator can be aggregated per type of device. For example, it could be of interest to know which types of devices or contact mechanisms are most or least conducive to a high trust score calculation for an authenticator, or on the contrary, applied to a low trust score calculation for an authenticator.

Trusted Platform Module and Binding

The authentication engine/agent may be implemented as a Trusted Platform Module (TPM) executing on computing device 150. The TPM may provide a secure platform to integrate the authentication software, or a portion thereof, for performing authentication of the requestor. For example, the TPM may provide secure, encrypted storage for records regarding authenticating the user, such as authenticator records or other data records, to maintain a level of integrity or "trust" that these records have not be illicitly or mistakenly accessed or altered. The TPM may also provide platform integrity, such that information communicated to the authentication engine (e.g. from the user or authenticators), including collecting data to onboard the user or data confirming or denying a user's identity, may be processed in an environment that can be trusted that the data was not tampered with prior to the completion of processing. Furthermore, in a system where passwords are used in part for the user to access resources, and the authentication process is only used in certain situations (e.g. specific transaction or when a password expires), the TPM may secure the integrity of the passwords from attacks, such as automated dictionary attacks, and secure the integrity of the environment when the user enters a new password, pincode, or other such data. The use of the TPM may be considered when calculating the trust score for a transaction, that is, authenticating a user on an authentication engine implemented as a TPM would result in a higher trust score than on a less secure platform. In this way, the use of the TPM would increase the overall confidence that the user is who he/she purports by binding the user to the device.

Similarly, a SIM card is uniquely identifiable and typically specific to a particular user. For instance, a mobile phone user needs often needs some form of identification to obtain a SIM card for activation. The confidence score could be increased if the system determines that the SIM card successfully matches the user's credentials. In addition, a serial number associated with the mobile device on which the SIM card is operating can be used to increase the overall trust score for the authentication process for the user. In the alternatively, a serial number that does not match the SIM card could decrease the confidence score.

While this invention has been particularly shown and described with references to example embodiments thereof, it will be understood by those skilled in the art that various changes in form and details may be made therein without departing from the scope of the invention encompassed by the appended claims. While specific example onboarding and authentication processes are described herein, those of ordinary skill in the field of trusted computing will appreciate that such processes are exemplary and similar processes are applicable and encompassed by the appended claims.

What is claimed is:

1. An interactive voice response (IVR) system configured to authenticate a requestor to perform transactions which require accessing secure resources protected by the system, the IVR comprising:
   a first application configured to send a voice request for authenticating a requestor as a user of the system;
   an IVR device coupled to a telephony server configured to:
      interpret the voice request received from the first application in order to retrieve at least one record corresponding to the user, and
      transmit (i) contact information for the user from the at least one record and (ii) at least one authenticator indicated in the at least one record as having a relationship with the user;
   a second application in communication with the at least one authenticator, the second application configured to:
      receive the user contact information and the at least one authenticator from the IVR device,
      automatically connect the requestor to the at least one authenticator using the user contact information, wherein determining a level of certainty that the requestor is the user based on the at least one authenticator interacting with the requestor, and
      send a voice response containing the determined level of certainty from the at least one authenticator to the IVR device; and
   the IVR device further configured to interpret the voice response from the second application in order to determine whether to allow the requestor access to the secure resources based on the determined level of certainty.

2. The IVR system of claim 1 wherein one or more of the authenticators is a third-party human trustee with a relationship to the user.

3. The IVR system of claim 1 wherein one or more of the authenticators is the user by means of a one or more calibrated devices.

4. The IVR system of claim 1 wherein sending at least one of the following: text, images, voice, video, or forensic data over the connection between the requestor and the at least one authenticator.

5. The IVR system of claim 1 wherein the one or more records contains at least one of: contact information, relationship information and verification information.

6. The IVR system of claim 1 wherein sending questions presented to the requestor and the requestor's corresponding answers over the connection between the requestor and the at least one authenticator.

7. The IVR system of claim 1 further comprising collecting, over the connection between the requestor and the at least one authenticator, data from the requestor in live or recorded form.

8. The IVR system of claim 1 further comprising analyzing data of the requestor collected from one or more of the following: requestor's electronic files, social or professional networking site, or one or more credit reporting agency databases.

9. The IVR system of claim 1 wherein the at least one authenticator determines whether the requestor is the user based on a conference call with the requestor.

10. The IVR system of claim 1 wherein determining whether to allow the requestor access to the protected resources is further based on determining a level of confidence in the ability of the at least one authenticator to identify the user.

11. The IVR system of claim 1 where determining whether to allow the user access to the protected resources is based on calculating a confidence score.

12. The IVR system of claim 1 wherein the IVR device is implemented as a Trusted Platform Module.

* * * * *